United States Patent
Wirthmüller et al.

(10) Patent No.: US 11,945,450 B2
(45) Date of Patent: Apr. 2, 2024

(54) METHOD FOR PREDICTING A TRAFFIC SITUATION FOR A VEHICLE

(71) Applicant: DAIMLER AG, Stuttgart (DE)

(72) Inventors: Florian Wirthmüller, Stuttgart (DE); Jochen Hipp, Tübingen (DE); Joachim Herbst, Nellingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 342 days.

(21) Appl. No.: 17/602,354

(22) PCT Filed: Mar. 18, 2020

(86) PCT No.: PCT/EP2020/057501
§ 371 (c)(1),
(2) Date: Oct. 8, 2021

(87) PCT Pub. No.: WO2020/212061
PCT Pub. Date: Oct. 22, 2020

(65) Prior Publication Data
US 2022/0169262 A1  Jun. 2, 2022

(30) Foreign Application Priority Data
Apr. 16, 2019  (DE) ................. 10 2019 002 790.6

(51) Int. Cl.
*B60W 50/00* (2006.01)
*B60W 50/04* (2006.01)
(Continued)

(52) U.S. Cl.
CPC ...... *B60W 50/0097* (2013.01); *B60W 50/045* (2013.01); *B60W 60/0027* (2020.02);
(Continued)

(58) Field of Classification Search
CPC .......... B60W 50/0097; B60W 50/045; B60W 60/0027; B60W 2050/0083;
(Continued)

(56) References Cited

U.S. PATENT DOCUMENTS

| 6,240,364 | B1 | 5/2001 | Kerner et al. |
| 6,442,453 | B1 | 8/2002 | Fukuoka |

(Continued)

FOREIGN PATENT DOCUMENTS

| CN | 1974273 A | 6/2007 |
| CN | 107264534 A | 10/2017 |

(Continued)

OTHER PUBLICATIONS

International Search Report dated Jun. 25, 2020 in related/corresponding International Application No. PCT/EP2020/057501.

(Continued)

*Primary Examiner* — Aniss Chad
*Assistant Examiner* — Chase L Cooley
(74) *Attorney, Agent, or Firm* — PATENT PORTFOLIO BUILDERS PLLC

(57) ABSTRACT

A method for predicting a traffic situation for an automatically operating vehicle involves constantly recording the surroundings of the vehicle and predicting a traffic situation of the vehicle is predicted for a future point in time using recorded surroundings data and prediction parameters. Upon reaching the future point in time, a current real traffic situation is recorded, the current real traffic situation is compared to the predicted traffic situation, and it is determined in the comparison whether a prediction error was present during the prediction. In the event of a prediction error, the prediction parameters are corrected.

4 Claims, 2 Drawing Sheets

Figure 1:
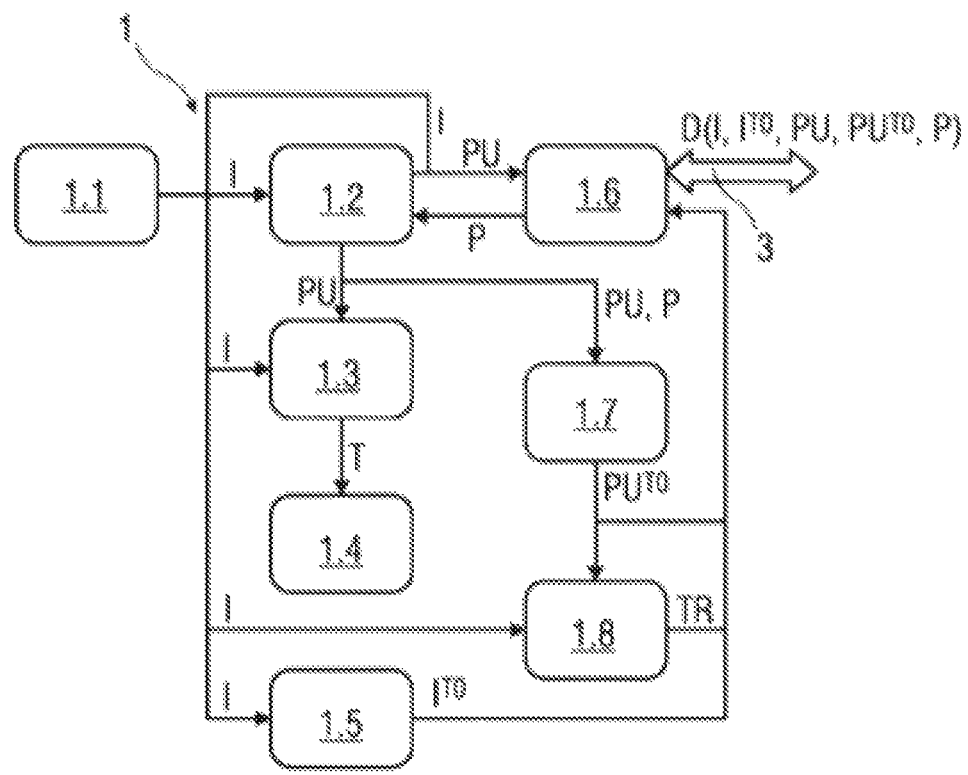

(51) Int. Cl.
*B60W 60/00* (2020.01)
*G08G 1/01* (2006.01)
*G08G 1/16* (2006.01)

(52) U.S. Cl.
CPC ........... *G08G 1/0133* (2013.01); *G08G 1/166* (2013.01); *B60W 2050/0083* (2013.01); *B60W 2556/45* (2020.02)

(58) Field of Classification Search
CPC . B60W 2556/45; G08G 1/0133; G08G 1/166; G08G 1/165; G08G 1/164
See application file for complete search history.

(56) References Cited

U.S. PATENT DOCUMENTS

| | | |
|---|---|---|
| 8,897,997 B2 | 11/2014 | Firl et al. |
| 10,474,151 B2 | 11/2019 | Netter |
| 2005/0012604 A1 | 1/2005 | Takahashi |
| 2016/0325743 A1* | 11/2016 | Schmüdderich ...... B60W 30/14 |
| 2018/0374359 A1 | 12/2018 | Li et al. |

FOREIGN PATENT DOCUMENTS

| | | | |
|---|---|---|---|
| CN | 108241889 A | 7/2018 | |
| CN | 108475056 A | 8/2018 | |
| DE | 19856704 A1 | 6/2000 | |
| DE | 19904909 A1 | 8/2000 | |
| DE | 10062856 A1 | 6/2002 | |
| DE | 102012005272 A1 | 10/2012 | |
| DE | 102011101359 A1 | 11/2012 | |
| DE | 102011083677 A1 | 4/2013 | |
| DE | 102013214225 A1 | 1/2015 | |
| DE | 102017212629 A1 * | 1/2019 | ........ B60W 30/0956 |
| DE | 102017212629 A1 | 1/2019 | |
| DE | 102017216202 A1 | 3/2019 | |
| DE | 102018008024 A1 | 4/2019 | |

OTHER PUBLICATIONS

Office Action dated Dec. 18, 2019 in related/corresponding DE Application No. 10 2019 002 790.6.
Written Opinion dated Jun. 25, 2020 in related/corresponding International Application No. PCT/EP2020/057501.
Office Action dated Aug. 22, 2022 in related/corresponding CN Application No. 202080029414.0.

* cited by examiner

METHOD FOR PREDICTING A TRAFFIC SITUATION FOR A VEHICLE

BACKGROUND AND SUMMARY OF THE INVENTION

Exemplary embodiments of the invention relate to a method for predicting a traffic situation for a vehicle, as well as a method for operating a vehicle that drives automatically, in particular highly automatically or autonomously.

DE 10 2012 005 272 A1 discloses a method for ascertaining the probability of a danger in a situation between two vehicles in which future movement trajectories of the vehicles are projected by movement hypothesis trajectories of the vehicles being generated, wherein, in a first method step depending on driver intentions of the two drivers of the vehicles, position data of the vehicles, movement data of the vehicles and surroundings information of the vehicles, possible mutual intersections of movement hypothesis trajectories of vehicles located in relative motion to one another and potential collisions due to the intersections are ascertained. In a second method step, potentially possible collision-free movement hypothesis trajectory pairs of the vehicles are ascertained and evaluated by means of the ascertained potential collisions, wherein respective movement clearances between the vehicles are ascertained in the evaluation and, depending on a size of the respective movement clearance, the probability of danger is ascertained.

Exemplary embodiments of the invention are directed to a novel method for predicting a traffic situation for a vehicle. Furthermore, exemplary embodiments of the invention are directed to a novel method for operating a vehicle that drives automatically, in particular highly automatically or autonomously.

In a method for predicting a traffic situation for a vehicle, in particular for a vehicle operated automatically, in particular highly automatically or autonomously, the surroundings of the vehicle are continuously recorded, and a traffic situation of the vehicle is predicted for a future point in time by means of recorded surroundings data and prediction parameters.

According to the invention, upon reaching the future point in time, a current real traffic situation is recorded, the current real traffic situation is compared to the predicted traffic situation and it is ascertained in the comparison as to whether a prediction error was present during the prediction. In the event of a prediction error being present, the prediction parameters are corrected.

By comparing the predicted traffic situation and the traffic situation actually recorded at the future point in time, the method advantageously makes possible a reliable detection of prediction errors. Thus, the method makes possible exact predictions of trajectories of vehicles in the surroundings of the vehicle even in the event of greatly varying base conditions, such that driver assistance systems and automatic driving functions can be implemented, which can function and react adequately at least in virtually every situation. When predicting the traffic situation, a generalization across all edge conditions and great errors are avoided, such that planning the trajectory is very safe and reliable. In doing so, it is advantageously taken into consideration that rules required for the actual prediction do not apply in specific base conditions in some circumstances, since these base conditions possibly have specific effects on driving behavior of other traffic participants. Thus, the method also makes possible, for example, a release of automatic driving functions with regard to legal and ethical points of view.

In a possible design of the method, the predicted traffic situation is based on likely movement behavior of other traffic participants in the surroundings of the vehicle. For example, the prediction is carried out with a prediction horizon that is 2 seconds to 5 seconds, such that the prediction for times of less than 2 seconds to times of less than 5 seconds can be carried out.

In a further possible design of the method, a prediction error is ascertained when a deviation ascertained in the comparison between the current real traffic situation and the predicted traffic situation exceeds a predetermined tolerance value. In doing so, a stable, safe, and reliable operation of the method is made possible and unnecessary changes of the prediction parameters in the event of small deviations are avoided.

In a further possible design of the method, the prediction parameters are provided by a central computing unit external to the vehicle. This makes it possible for the prediction parameters to be able to be retrieved by the vehicle when it requires them. In contrast, a laborious and long-term storage of the prediction data in the vehicle is not required. Furthermore, it is ensured that current prediction parameters are always available to the vehicle.

In a further possible design of the method, when a prediction error is present, a dataset, which comprises data underlying the prediction, the prediction parameters, the predicted traffic situation, and the real traffic situation, is transmitted to the central computing unit, and the prediction parameters are corrected by means of the computing unit depending on the dataset. This external correction of the prediction parameters by means of the computing unit makes possible an effective and central correction, such that a hardware expenditure for the vehicle can be minimized. At the same time, it is ensured that current prediction parameters are always available to the vehicle and optionally further vehicles.

In a further possible design of the method, the correction of the prediction parameters is carried out by means of datasets generated by means of a plurality of vehicles and transmitted to the computing unit. Based on a comparison and an assessment of the datasets from several vehicles, a particularly high degree of accuracy of the prediction parameters can be ensured, for example when datasets of several vehicles are present for a location, since detection errors of individual vehicles are safely recognized.

In a further possible design of the method, the correction of the prediction parameters is carried out by means of a learning algorithm, in particular an artificial neuronal network. This enables a constant improvement of the correction of the prediction parameters and thus a constant improvement of a degree of accuracy of the prediction parameters themselves.

In a further possible design of the method, the central computing unit external to the vehicle requests vehicles to respectively transmit a dataset to the computing unit at positions characterized as critical when a prediction error is not present, wherein the dataset comprises data underlying the prediction, the prediction parameters, the predicted traffic situation, and the real traffic situation. Thus, in the event of a correction of the prediction parameters, a database for non-erroneous predictions is available.

In the method according to the invention for operating a vehicle driving automatically, in particular highly automatically or autonomously, in the event of an automatic journey, the method described above for predicting a traffic situation is carried out and, before driving along a route portion, the vehicle retrieves prediction parameters valid for this route portion from at least one central computing unit external to the vehicle.

Due to the use of the method for predicting the traffic situation, the method advantageously enables the reliable recognition of prediction errors by comparing the predicted traffic situation and the traffic situation detected in reality at the future point in time and the exact predictions of trajectories of vehicles emerging from this in the surroundings of the vehicle even in the event of greatly varying base conditions. Thus, driver assistance systems and automatic driving functions can be implemented that can adequately function and react at least in virtually any situation. This makes possible a particularly safe automatic operation of the vehicle, wherein it is furthermore possible to release automatic driving functions for vehicles with regard to legal and ethical points of view.

In a possible design of the method, a trajectory of the vehicle is planned for the automatic driving operation depending on a result of the prediction taking probable movement behavior of other traffic participants into consideration. Based on the exact prediction, a particularly safe automatic operation of the vehicle can be implemented.

In a further possible design of the method, in the automatic driving operation, the planned trajectory is implemented by means of an automatic control and/or regulation of a longitudinal and/or transverse movement of the vehicle, in order to achieve a high degree of automatization and thus a high level of comfort for vehicle users.

Exemplary embodiments of the invention are explained in more detail below by means of drawings.

BRIEF DESCRIPTION OF THE DRAWING FIGURES

Figure 2:
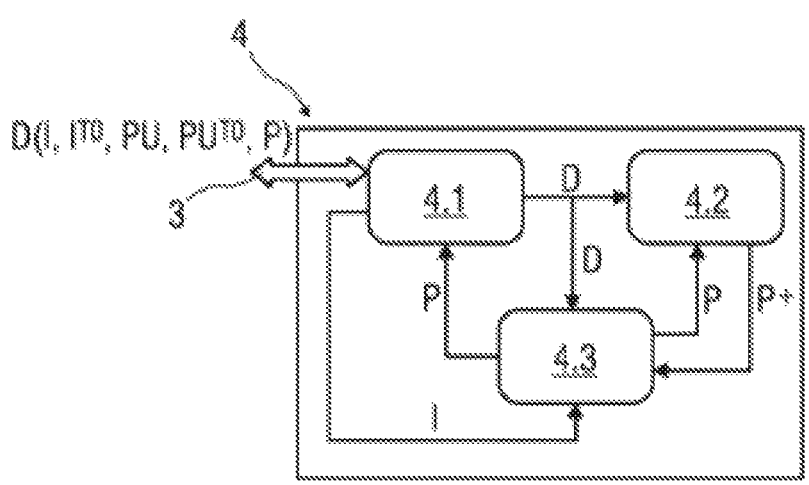
Figure 3:
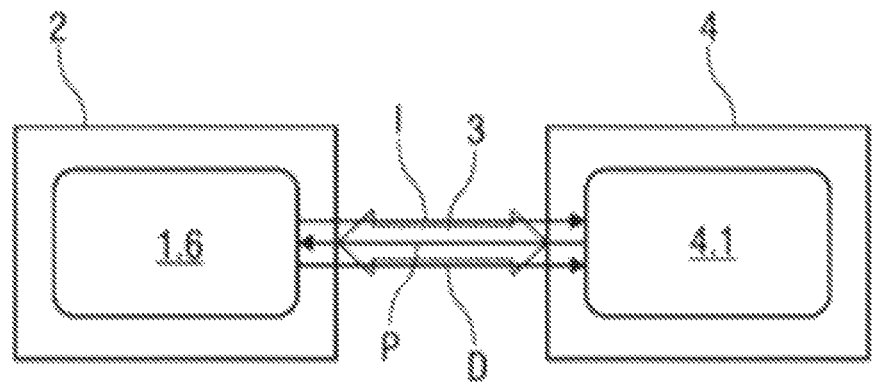
Figure 4:
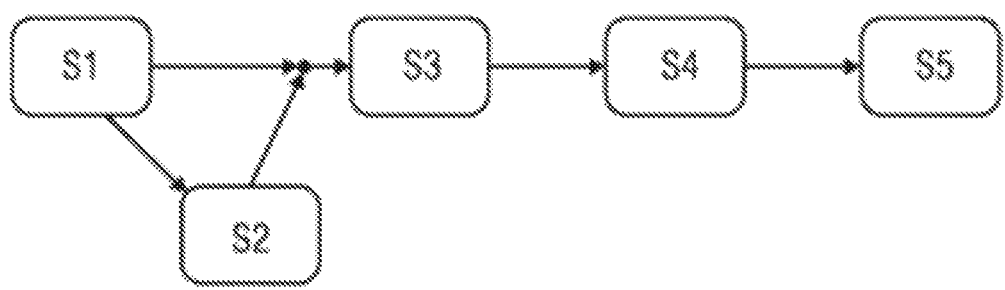

Here are shown:

FIG. 1, schematically, a block wiring diagram of a device for operating a vehicle, FIG. 2, schematically, a block wiring diagram of a computing unit external to the vehicle, FIG. 3, schematically, a block wiring diagram of a vehicle and a computing unit external to the vehicle, and FIG. 4, schematically, a flowchart of a method for operating a vehicle.

Parts corresponding to one another are provided with the same reference number in all figures.

DETAILED DESCRIPTION

In FIG. 1, a block wiring diagram of a device 1 for operating a vehicle 2 depicted in more detail in FIG. 3 is depicted, wherein the vehicle 2 is formed for an automatic, in particular highly automatic or autonomous driving operation.

Planning a trajectory T of the vehicle 2 is necessary for such an automatic operation of the vehicle 2 depending on a current and a predicted traffic situation PU.

For this planning, the device 1 comprises a sensor system 1.1 specific to the vehicle, a prediction module 1.2 for predicting the traffic situation PU, a planning module 1.3 for planning the trajectory T, an implementation module 1.4 for implementing the trajectory T, a sensor system buffer 1.5, a communication module 1.6 for communication via a communication channel 3, a prediction buffer 1.7, and a comparison module 1.8.

In order to implement an automatic driving function of the vehicle 2, constantly current surroundings data of the vehicle 2, also referred to as sensor information I, is recorded by means of the sensor system 1.1 specific to the vehicle.

A prediction of the traffic situation PU is continuously carried out by means of the prediction module 1.2 by means of the sensor information I, in order to ascertain predicted surroundings data, i.e., the predicted traffic situation PU, for a future point in time, for example for the next 2 seconds to 5 seconds.

The prediction is carried out depending on the expected behavior of other traffic participants. These expectations constitute prediction parameters P depicted in more detail in FIG. 2, i.e., base conditions, which underlie the prediction. Thus, it is assumed, for example, that other traffic participants abide by traffic regulations and do not perform a change of lane, for example, across a drawn-through lane marking, do not use a hard shoulder for overtaking, notify, and display an intended change of lanes by activating the indicator light, etc. Furthermore, it is assumed that traffic participants adjust their behavior to a traffic flow, not forcing others to brake or swerve, etc.

Depending on a result of the prediction, in particular taking a probable movement behavior of other traffic participants into consideration, planning trajectories T is carried out by means of the planning module 1.3, wherein a planned trajectory T is implemented by means of interventions in a longitudinal and transverse movement of the vehicle 2 by means of the implementation module 1.4.

Both the recorded surroundings data, i.e., the sensor information I, and the predicted surroundings data, i.e., the predicted traffic situation PU, are cached for a later evaluation. This caching is carried out for the sensor information I in the sensor system buffer 1.5 and for the predicted traffic situation PU with the corresponding prediction parameters P in the prediction buffer 1.7. At the outlet of sensor system buffer 1.5, buffered sensor information $I^{TO}$ can then be retrieved and buffered predicted traffic situations $PU^{TO}$ can be retrieved at the outlet of the prediction buffer 1.7.

At a later point in time, the actual surroundings data recorded at this point in time, i.e., the corresponding sensor information I recorded at this point in time and thus an actual real traffic situation recorded at this point in time is compared to the traffic situation PU predicted for this point in time by means of the comparison module 1.8. Here, a buffered predicted traffic situation $PU^{TO}$, which comprises buffered corresponding prediction parameters P, is allocated to the comparison module 1.8 out of the prediction buffer 1.7. If this comparison results in a deviation between the actually recorded traffic situation and the predicted traffic situation PU lying outside a predetermined tolerance region, the comparison module 1.8 generates a trigger TR, such that a dataset D with the real traffic situation, the traffic situation PU predicted for the same point in time, the sensor information I, from which the predicted traffic situation PU has been ascertained, and prediction parameters P, which underlie the prediction, is transmitted by means of the communication module 1.6 via the communication channel 3 to a central computing unit 4 external to the vehicle depicted in more detail in FIG. 2, for example a so-called backend server.

It can happen that traffic participants at certain locations, at certain points in time, or in certain situations frequently do not behave as expected. For example, it can be that traffic participants on motorways in traffic jam situations or in commuter traffic use a hard shoulder, contrary to the rules, more often than the usual pulling out of lanes or, in the event of rain or low sun, are blinded and unexpectedly brake more regularly than usual or leave a driving lane. A prediction module 1.2, which cannot incorporate any kind of knowledge about such specific situations or such a location, would now have to assume that the other traffic participants would, in all probability, not drive over the markings, whereas a human who is knowledgeable about this location or such a situation, already incorporates this experience in their prediction.

Similarly, it is assumed that saved sensor signals and thus the sensor information I are without error. However, the sensor signals can more often than otherwise be erroneous at certain locations and in certain situations, for example due to reflections as a result of wet driving lane surfaces.

This unexpected behavior of the other traffic participants or the unexpected erroneous sensor signals can lead to prediction errors, an incorrect predicted traffic situation PU, as a result to an incorrectly planned trajectory T and thus, in extreme cases, to collisions. As a result of the comparison to the traffic situation PU predicted for a later point in time with the traffic situation actually ascertained at this later point in time, it is possible to recognize a prediction error. When the comparison results in a deviation, which exceeds a certain tolerance value, there is a prediction error. When the conditions are still known, in which the prediction has been carried out and the prediction parameters P are known, which underlie the prediction, it is possible to correct the prediction parameters P in such a way that the prediction error is minimized. When the prediction error occurs, for example, at certain times of day, such as e.g., in commuter traffic in the morning, at certain locations, such as e.g., motorway exits, in certain situations, such as e.g., in the event of traffic jams or rain, the prediction parameters P for these times of the day, locations or situations are corrected.

Thus, the possibility is created of comprehending a traffic situation in such a way as to predict into the future and also to react to this in such a way, such as a person being able to draw on their wealth of experience. In order to be able to also provide this "wealth of experience" to new vehicles 2, the vehicles additionally require a collective memory or wealth of experience. Base conditions that can play a role here are, inter alia, anomalies specific to a region, visibility conditions, a time of day, the weather, a traffic state, etc.

This correction is carried out by means of the central computing unit 4 external to the vehicle that simultaneously forms the collective memory or the collective wealth of experience for the vehicles 2.

FIG. 2 shows a block wiring diagram of a possible exemplary embodiment of a central computing unit 4 external to the vehicle.

The computing unit 4 comprises a communication module 4.1 for communicating with the device 1 via the communication channel 3, a module 4.2 for improving parameters, and a parameter memory 4.3 adapted to the context.

The computing unit 4 receives, from a plurality of vehicles 2, the datasets D in each case with a real traffic situation, the predicted traffic situation PU predicted for the same point in time, the sensor information I from which the predicted traffic situation PU has been ascertained, and prediction parameters P that underlie the prediction.

The computing unit 4 thus has a large database available. The received datasets D are clustered in the computing unit in order to identify regions at which reported prediction errors usually emerge. Furthermore, the dataset D is supplied to the module 4.2. When a clustering of prediction errors is established at certain locations, the prediction parameters P, which are used at these locations for the prediction, are corrected for the purpose of a minimization of the prediction errors by means of the module 4.2. The correction is possible since is it known as a result of the received datasets what is the input data of the prediction, what is the output data of the prediction, i.e., the respective predicted traffic situation PU, and how the output data should actually have been, i.e., the actual traffic situation ascertained at the prediction point in time. A correction can be carried out by means of a learning method, for example by means of an artificial neuronal network. In order to correct the prediction parameters P, it is ascertained, for example by means of aggregation, to which concrete reason certain prediction errors can be attributed, such as e.g., many errors at the same time of day and/or at the same location. A series of input parameters, for example a transverse speed, a distance apart from the person in front, etc. and output parameters, for example a relative transverse position in 1 second, a relative longitudinal position in 1 second, a relative transverse position in 2 seconds, is presented to the learning system. Using these presented datasets D, the system then learns. If it is established here that the behavior deviates greatly for example between day and night, the amounts of data are distributed along this parameter and the data presents two parallel system for learning, for example in two separate learning processes. These two learned systems are then respectively prediction components, which apply under the certain conditions and are formed to be architectonically identical, yet contain deviating parameter combinations.

Corrected prediction parameters $P^+$ are then stored in a context sensitive manner in the parameter memory 4.3 together with the corresponding sensor information I and the dataset D and provided to the vehicles 2 for retrieval via the communication channel 3.

In a possible design, vehicles 2 are requested by the central computing unit 4 external to the vehicle to respectively transmit a dataset D to the computing unit 4 at positions labelled as critical in the case of a prediction error not being present, wherein this dataset D also comprises data underlying the prediction, the prediction parameters P, the predicted traffic situation PU, and the real traffic situation. Thus, in the event of the prediction parameters P being corrected, a database is available for predictions without error.

Before it drives through a certain route section, a vehicle 2 driving automatically retrieves from the computing unit 4 the prediction parameters P applicable to this route section for the prediction algorithm and—as described under FIG. 1—then carries out the prediction of the traffic situation PU and the planning of the trajectory T. The automatic driving operation of the vehicle 2 is then carried out based on this trajectory T. This means that vehicles 2 then retrieves from the computing unit 4 any peculiarities to be taken into consideration for their current situation, i.e., their current position, time of day etc.

In doing so, the vehicles 2 respectively retrieve parameter adaptations for the respective prediction components in the current situation, such as, for the example of driving over driving lane markings on motorway slip roads, an increase of a lane change probability despite drawn-through marking, for example. The prediction component is made known by the corrected prediction parameters $P^+$ in that certain peculiarities are to be calculated, such that this can accordingly adapt to the prediction.

For the example of driving over the marking on a motorway slip road, the correction of the prediction parameters P can be carried out as follows.

Using many collected datasets D, it is established that traffic participants on a motorway slip road are suitable for undertaking a lane change despite a drawn-through lane, although this is in violation of the rules and contradicts normal driving behavior in such situations. This inadmissible exceeding can be recognized in that vehicles 2 of a fleet observe both the markings and the movements of the other traffic participants using their sensor system 1.1, for example cameras, radars, etc. Information about the irregularity at the location in question is now provided to all subsequent vehicles 2, which will pass this location, by means of the computing unit 4. They can react to the prediction of the movement of the surrounding traffic participants as a result of the information by adjusting their prediction parameters P and thus, in this example, clearly increase the probability of going back into lane for vehicles "behind" the drawn-through marking in comparison to the probabilities that are normally very low. Thus, an actual prediction accuracy at this geolocation can be drastically increased.

The datasets D are collected in the computing unit 4 when it is established in the vehicle 2 that the prediction for one of the other traffic participants at a certain point poorly coincides with the actually driven trajectory of the traffic participant. A component is provided for this that has the predictions available at least for the maximum temporal duration of the predictions, such that forecasts made in the past for the current point in time can be matched to the knowledge obtained in the meantime, i.e., sensor information I, about the traffic situation. This component is formed by the sensor system buffer 1.5 and the prediction buffer 1.7.

In FIG. 3, a block wiring diagram of a vehicle 2 and a computing unit 4 external to the vehicle are depicted. The vehicle 2 and the computing unit 4 communicate via the communication channel 3 by means of their respective communication modules 1.6, 4.1.

Here, the communication is carried out in such a way that, depending on a currently detected situation, the corresponding current sensor information I is transmitted from the respective vehicle 2 to the computing unit 4.

Should the comparison module 1.8 have triggered a dataset D, this additionally comprises information from the sensor system 1.1 and the contents of the sensor system buffer 1.5 and the prediction buffer 1.7.

In addition, in the event of an answer of the computing unit 4 to the vehicle 2, the prediction parameters also obtain, inter alia, peculiarities in the form of parameterization for the prediction module 1.2.

FIG. 4 shows a flowchart of a possible exemplary embodiment of a method for operating a vehicle 2.

In a first method step S1, the traffic situation is recorded by means of the sensor system 1.1, wherein the prediction of the traffic situation PU, in particular by means of vehicle control apparatus and software implemented on this, is carried out by means of context information provided by the computing unit 4 in a second method step S2 in a third method step S3.

Finally, in a fourth method step S4, the planning of the trajectory T, in particular by means of the vehicle control apparatus and software implemented on this, and in a fifth method step S5, the implementation of the trajectory T is carried out by means of corresponding actuators of the implementation module 1.4.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a highly automated or autonomous vehicle, the method comprising:
    constantly recording, by the vehicle, surroundings of the vehicle to produce recorded surroundings data;
    providing, by a central computing unit external to the vehicle to the vehicle, prediction parameters;
    predicting, by the vehicle, a traffic situation of the vehicle at a future point in time using the recorded surroundings data and the prediction parameters;
    recording, by the vehicle, upon reaching the future point in time, a current real traffic situation;
    comparing, by the vehicle, the current real traffic situation to the predicted traffic situation;
    determining, by the vehicle based on the comparison, whether the predicted traffic situation includes a prediction error; and
    correcting, by the central computing unit responsive to determining that the predicted traffic situation includes the prediction error, the prediction parameters, wherein before driving along a route portion, the vehicle retrieves prediction parameters applicable to the route portion from at least one central computing unit external to the vehicle, and wherein, depending on the result of the prediction, a trajectory of the vehicle is planned for automatic driving operation taking probable movement behavior of other traffic participants into consideration,
    automatically controlling or regulating the highly automated or autonomous vehicle based on the planned trajectory,
    wherein the central computing unit corrects the prediction parameters based on datasets generated by a plurality of vehicles and transmitted to the central computing unit and the method further comprising
    requesting, by the central computing unit, the plurality of vehicles to respectively transmit the datasets at positions characterized as critical and at which a prediction error is not present, wherein the dataset comprises data underlying the prediction, the prediction parameters, the predicted traffic situation, and the real traffic situation.

2. The method of claim 1, wherein the prediction error is determined when a deviation is determined based on the comparison and the predicted traffic situation exceeds a predetermined tolerance value.

3. The method of claim 1, further comprising:
    transmitting, when it is determined there is a prediction error, a dataset comprising data underlying the prediction, the prediction parameters, the predicted traffic situation, and the current real traffic situation, to the central computing unit; and correcting, by the central computing unit, the prediction parameters.

4. The method of claim 3, wherein the central computing unit uses an artificial neural network to correct the prediction parameters.

\* \* \* \* \*